United States Patent [19]

Johnson et al.

[11] Patent Number: 4,882,067

[45] Date of Patent: Nov. 21, 1989

[54] PROCESS FOR THE CHEMICAL BONDING OF HEAVY METALS FROM SLUDGE IN THE SILICATE STRUCTURE OF CLAYS AND SHALES AND THE MANUFACTURE OF BUILDING AND CONSTRUCTION MATERIALS THEREWITH

[75] Inventors: Barrett Johnson, Sunnyvale; Charles B. Rubenstein, Los Gatos, both of Calif.

[73] Assignee: Ceramic Bonding, Inc., Mountain View, Calif.

[21] Appl. No.: 186,562

[22] Filed: Apr. 27, 1988

[51] Int. Cl.⁴ .......................... B01D 15/00; C02F 1/28
[52] U.S. Cl. ........................................ 210/688; 210/751
[58] Field of Search ................. 210/688, 751; 501/155

[56] References Cited

U.S. PATENT DOCUMENTS

| | | | |
|---|---|---|---|
| 2,653,089 | 11/1949 | Brooke | 75/108 |
| 2,682,504 | 6/1954 | Harrison et al. | 204/158 |
| 2,786,772 | 3/1957 | Stewart et al. | 106/40 |
| 2,808,154 | 10/1957 | Scott | 210/266 |
| 2,914,923 | 12/1959 | Harrison | 61/5 |
| 2,921,916 | 1/1960 | Harrison et al. | 260/2.5 |
| 3,033,641 | 5/1962 | Thomas, Jr. | 23/1 |
| 3,056,704 | 10/1962 | Rothweiler et al. | 154/2.6 |
| 3,093,593 | 6/1963 | Arrance | 210/682 |
| 3,154,816 | 11/1964 | Harrison et al. | 18/30 |
| 3,201,136 | 8/1965 | Harrison et al. | 277/198 |
| 3,251,322 | 5/1966 | Downs et al. | 108/58 |
| 3,275,721 | 9/1966 | Leroy et al. | 264/60 |
| 3,355,196 | 11/1967 | Harrison et al. | 287/20.92 |
| 3,422,589 | 1/1969 | Harrison | 52/309 |
| 3,461,844 | 8/1969 | Harrison | 119/28 |
| 3,682,110 | 1/1972 | Harrison | 108/58 |
| 3,736,253 | 5/1973 | De Angelis et al. | 210/27 |
| 3,859,210 | 1/1975 | Hatch | 210/28 |
| 3,917,530 | 11/1975 | Boske | 210/170 |
| 4,054,515 | 10/1977 | Sawyer, Jr. | 210/27 |
| 4,067,894 | 1/1978 | Yuki et al. | 252/446 |
| 4,110,499 | 8/1978 | Harrison | 428/35 |
| 4,116,825 | 9/1978 | Sawyer, Jr. | 210/27 |
| 4,116,826 | 9/1978 | Sawyer, Jr. | 210/27 |
| 4,116,827 | 9/1978 | Sawyer, Jr. | 210/27 |
| 4,116,828 | 9/1978 | Sawyer, Jr. | 210/27 |
| 4,133,755 | 1/1979 | Tarso et al. | 252/430 |
| 4,255,067 | 3/1981 | Wright | 405/129 |
| 4,256,587 | 3/1981 | Carnahan et al. | 210/670 |
| 4,279,756 | 7/1981 | Weiss et al. | 210/667 |
| 4,334,999 | 6/1982 | Cornwell | 210/638 |
| 4,440,867 | 4/1984 | Sabherwal | 502/62 |
| 4,443,562 | 4/1984 | Mayer | 521/83 |
| 4,517,095 | 5/1985 | Caeser | 210/665 |
| 4,530,765 | 7/1985 | Sabherwal | 210/663 |
| 4,601,832 | 7/1986 | Hooykaas | 210/717 |
| 4,615,643 | 10/1986 | Gouvenot | 405/128 |
| 4,676,907 | 6/1987 | Harrison | 210/617 |

OTHER PUBLICATIONS

Editorial, "Remarkable Breakthrough", *The San Diego Union*, 11/5/86.
Tonge, "Waste-treatment Breakthrough", *The Christian Science Monitor*, 1/14/86, p. 23.
Kinkhabwala & Mehta, "Case Study: Transportable incineration Technologies for Permanent Superfund Remediations", *Hazardous Waste Management*, 2/88, pp. 18-21.
La Rue, "Process Will Convert Waste into Ceramics", *The San Diego Union*, 11/1/86, pp. B-1 & B-9.
Richmond, "New Process Pulls Toxins from Waste", *The Tribune*, 11/1/86, p.C-2.
Cabaniss, "Waste Treatment Process Wins State Approval", *The Daily Californian*, 11/2/86, p.3A.

*Primary Examiner*—Ivars Cintins
*Attorney, Agent, or Firm*—Blakely, Sokoloff, Taylor & Zafman

[57] ABSTRACT

The present invention relates to a process for removing contaminants, particularly heavy metal cations from industrial sludge and other industrial materials. The process comprises mixing the industrial wastes with specific fine clay or shale particles to form pellets which are heated at high temperature to form a nonhazardous sintered product. The product is then utilized in the manufacture of bricks, cinder blocks and other building materials and surfaces.

14 Claims, 1 Drawing Sheet

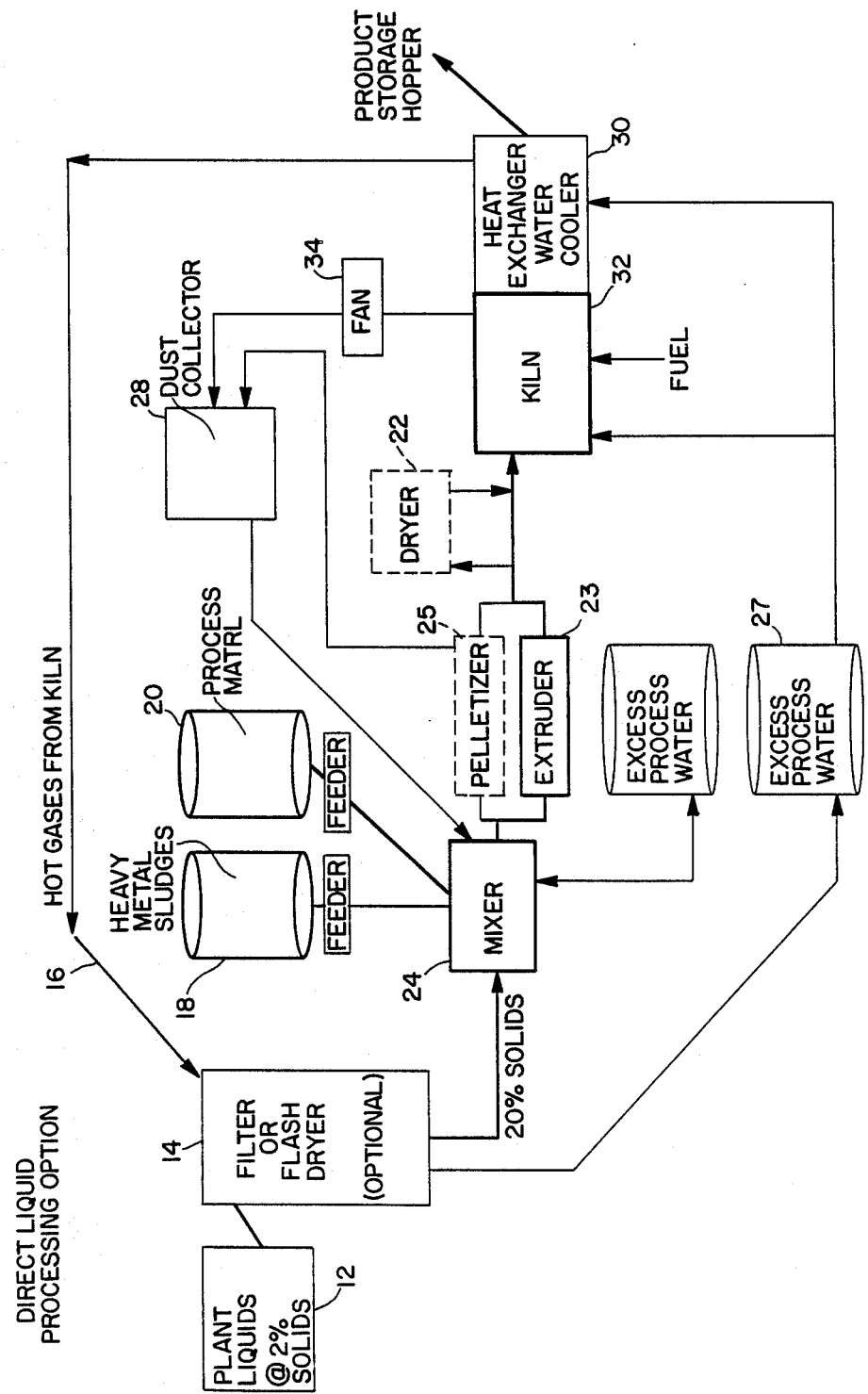

PROCESS FOR THE CHEMICAL BONDING OF HEAVY METALS FROM SLUDGE IN THE SILICATE STRUCTURE OF CLAYS AND SHALES AND THE MANUFACTURE OF BUILDING AND CONSTRUCTION MATERIALS THEREWITH

BACKGROUND OF THE INVENTION

1. FIELD OF THE INVENTION

This invention relates to a method of treating waste sludge to remove the heavy metal contaminants therefrom, and the utilization of the resultant product of the removal process in the manufacture of building products such as brick, cinder blocks, concrete aggregate and other construction materials.

2. ART BACKGROUND

Currently available methods for purifying water and industrial sludge are generally incapable of removing certain chemicals and biologically active substances that are appearing in water supplies in increasing proportions. The continued pollution of our water is becoming more alarming as the mechanisms for purifying the water are shown to be unable to handle the large and increasing supply and variety of contaminants.

Standard methods for purifying water include coagulation, sedimentation, filtration and chemical treatment. Such methods are effective for removing most contaminants and for killing most of the microorganisms present. These methods, however, are not completely effective for removing substances such as hormones, pesticides, viruses, toxins and, most importantly, for the present purposes, heavy metal cations.

The waste of many high tech industries is particularly problematic because heavy metals, which are used in many of the manufacturing processes in the plating, semiconductor and computer industries, are toxic to living organisms.

A large number of prior art processes are available for the extraction of toxic waste from water and industrial sludge. Many of these processes utilize various types of clay, either natural or partially synthesized, to absorb or adsorb the heavy metals and other toxic materials such as viruses, hormones, pesticides, bacterial toxins and the like from water and industrial waste.

Sawyer, U.S. Pat. No. 4,054,515 discloses a method of treating water with various grades of specified clays, including attapulgite and sepiolite, by contacting the water with such clays or percolating the same through the clays. However, the Sawyer clays are formed in accicular-type needles disposed in solution in order to extract the heavy metal cations and other contaminants. Other relevant patents relating to the processing of industrial sludge and water waste include U.S. Pat. Nos. 4,676,907; 4,067,894; 4,116,828 and 4,517,095.

One problem which has evolved with these processes is that the material used to purify the water is then, itself contaminated and must be properly treated and disposed of. In the past, this type of processing of the purification material included loading the same into metal containers and disposal thereof in landfills and underground containment systems, and in some cases, the disposal of the purification material without packaging into landfills and the like. This means of disposal is particularly wasteful in that it requires a substantial amount of manpower to carefully handle the purification materials, process the purification materials and dispose of them in an appropriate manner. More costs are obviously involved in the landfills and underground storage of such materials. A substantial drawback to the above-described prior art is that the long term storage of these waste processing materials is generally wasteful in that they are merely disposed of in storage dumps with possible long term environmentally deleterious effects and resulting on-going liability, and there is no useful purpose for the waste materials as well. Estimates are that it costs approximately $400-$1,200 per ton to process hazardous waste, ship and dispose of the same at legal dump sites. It would be desirable to provide a process which would eliminate long term storage risks and substantially reduce the cost of disposing of the heavy metal waste contaminants by converting them to safe useful products.

There have been recent reports relating to a processing plant in San Diego whereby heavy metals and other contaminants were removed from municipal waste sludge and converted to ceramic pellets which could be mixed into concrete. This concrete material is alleged to be safe and further, provides a useful outlet for disposing of the various toxic wastes having to utilize landfill sites.

SUMMARY OF THE INVENTION

The present invention comprises a process for removing certain contaminants including toxic metallic cations from water and industrial sludges and other organic components as well as many other types of contaminants. It does this by sintering an intimate mixture of sludge and fine clay formed into pellets in a rotary kiln or calciner at maximum temperatures of between 1500° Fahrenheit and 2700° Fahrenheit for 5 to 30 minutes.

The raw sludge is first mixed with any of a variety of clays, and particularly, in the preferred embodiment, clays such as Kaolinite and Montmorillonite, and those clays and shales containing hydrous alumina-silicates. Shale, a mixture of clay and shale or an impure form of any of these, can be used in place of the clay. The ratio of clay (or substitute material as noted above) to sludge can be in the range of 1:1 to 40:1 on a dry basis.

If the water content of the incoming sludge is too high to form acceptable pellets to be easily extruded, the excess water is removed by one or more of the following processes: flash dryer, precipitation, floculation, filtering, or gravity settling. Sludge and clay are simultaneously fed into a mixer designed to break down clay lumps and intimately mix the fine clay and sludge. If shale or hard clay material is used, it is pre-ground in a hammermill before being added to the mixer. Additives may be added to the mixer to enhance the desirable nonhazardous product or reduce the cost of processing.

From the mixer, the sludge/clay mixture will go into a pelletizer or extruder to form product nodules that would result in correct sizing for the final product to be utilized in the construction industries. From the pelletizer or extruder the nodules go to the rotary kiln where several processes occur.

In the kiln the first process is drying the pellets. Next the pellets are heated to the maximum temperature at which time the metallic cations chemically combine with the silicates in the clay or shale to form chemically inert, safe compounds that are strongly bonded so they cannot be easily extracted in accordance with any of the federal or state tests developed for this purpose. The material is then cooled.

The clay/sludge ratio, kiln temperature and residence time can be optimized for each application as a function of types of metallic cation types present, their concentrations and quality of available clays and shales. In the preferred embodiment, the parameters are 8:1 for clay/sludge, kiln temperature of 2000° Fahrenheit, total kiln residence time of 30 minutes including pellet drying time and 10 minutes in kiln at maximum temperature.

The resulting product has many uses in the construction industries for use in the manufacture of concrete blocks, bricks and other building products and for use in roads, curbs, flooring, decking and other building and construction applications.

BRIEF DESCRIPTION OF THE DRAWINGS

FIG. 1 is a process flow diagram of the present invention.

DETAILED DESCRIPTION OF THE INVENTION

The present invention relates to the processing of industrial sludge and contaminated water containing heavy metals which are generally considered to be toxic to humans and animal life, including arsenic, cobalt, cadmium, chromium, lead, nickel, selenium, thallium, zinc, magnesium, copper, antimony, barium, molybdenum, rare earths and the like and incidental organic toxins. In general, the invented process comprises a batch or continuous operation for the processing of industrial waste and contaminated water. The process developed as described in this patent is not limited to only Montmorillonite clays. The process has been expanded to include other clays and shales.

In the first step, the various elements in the sludge are checked to determine their identity and concentration. Moisture content of the sludge is also measured. Preferably it contains 10% to 40% solids.

Much of the liquid industrial waste has a solid content of an order of magnitude less than the desired liquid content of the material to be fed into the process (e.g., on the order of 1% solids or less). If necessary, the liquid industrial waste can be partially de-watered using a flash dryer, precipitation, floculation, filtering, gravity settling, filter press or other process to remove excess liquid and thereby concentrate the solid content to within the desired levels. The flash dryer can optionally be heated utilizing exhaust gases from the kiln. As shown in FIG. 1, the waste liquids 12 are transferred into the flash dryer 14 and the hot gases are pumped into the flash dryer through conduit 16. The semi-dry process material having the appropriate solid concentration is then transferred to the mixer 24. Alternatively, heavy metal sludge having the appropriate or higher liquid content is obtained and loaded into the heavy metal sludge container 18.

The waste material is then mixed with the clay process material disposed in container 20 with any of a variety of clays. The process material comprising clay, or shale, and in the preferred embodiment, particularly kaolinite, and/or montmorillonite and those clays and shales containing minerals that include hydrous alumina-silicates or with any of a variety of clays, shale, a mixture of clay and shale, or an impure form of any of the foregoing can be used in place of the clay. The ratio of clay or substituted material to sludge can be in the range of 1:1 to 40:1 on a dry basis depending on the quality of the clay (or substitute material) and the number and concentration of the heavy metal cations in the sludge.

The clay and shales are a naturally occurring family of minerals that are hydrous alumina-silicates that may contain one or more of the following (or other equivalent) minor or trace elements: magnesium, iron, potassium, sodium and oxygen. Shale and clay are similar types of rocks, differing to some extent in degree of geological weathering, hardness and friability as a result of differences in geological and climatic conditions both at time of formation and thereafter. Clay and shales have in common the silicate composition desirable for this invention and may be either comingled or difficult to differentiate.

Structurally, the clay minerals consist of layers of aluminum and silicon ions or atoms bonded together by oxygen atoms or combinations of oxygen and hydrogen atoms which are between the two layers. The clay mineral particles are held together by electrostatic charges on the surfaces and edges of the particles Magnesium and iron replace some of the aluminum atoms in some clay minerals. Replaceable sodium, calcium and potassium ions occur on the surfaces and edges of many clay mineral particles. These replaceable ions or any ions and molecular layers of water between the clay particles determine to a large extent the plastic properties of a clay mineral. Clays, on the basis of their mineralogy, are grouped under three types: kaolinites, montmorillonites and illites. The Kaolinite group include the minerals kaolinite, dickite, nacrite, halloysite, anauxite and allophane; all are hydrous aluminum silicates. Montmorillonite, saponite, notronite, hectorite and beidellite comprise the montmorillonite group and consist of hydrous silicates of aluminum, magnesium, iron and some varieties of lithium. Montmorillonites commonly contain calcium and sodium as replaceable ions. Illite, as a group name, has been applied to the micaceous varieties of clay which are complex hydrous silicates of potassium, aluminum, iron and magnesium. Although Kaolinite and Montmorillonite are preferred, other clays described above and shales have been found to work for this process and also may be used.

The clay or shale is divided into small (fine) particles during processing to increase the maximum adsorption of the heavy metals. The clays, located in the Sierra foothills east and/or north of Sacramento, California and typified by Kaolinite, may be obtained from several western quarries. Typical of these sources are quarries located near the towns of Lincoln and Ione. After obtaining the clay or shale from any of the foregoing sources, it is processed into a very fine particle form. Most clays will degrade into the fine particle size required in this invention in a properly designed mixer. If the clay or shale is hard, it will have to be pre-crushed to desired fineness.

The fine clay or shale particles and raw sludge are combined together in a mixer. The mixer is designed to thoroughly mix the clay and sludge into a homogenous mixture. The sludge is exposed to the high surface area of the clay so that maximum ion exchange may take place. The mixer may be operated in the batch or continuous mode.

Additives may be added to this mixture that will improve and enhance the qualities of the produced nonhazardous product or reduce the cost of processing. Depending on the selected clay or shale and/or the nature of the sludge composition, fluxing agents could be added at the mixer to reduce the sintering temperature in the kiln. It may be desirable to reduce the temperature at which the reaction between the heavy metal cations and clay or shale occur in the kiln. Reduced temperature provides potential capital and operating economic savings. Other additives, such as organics or fine coke could be added at the mixer to produce a final product that has higher economic value than it would otherwise. An example of this would be light weight aggregate. The same or additional additives may beneficially alter the structure of the product and would be added to create a product with added strength or other desirable properties.

If water content of the incoming sludge is too high to form acceptable pellets or be easily extruded, the excess water will be removed. The following or other processes may be utilized for this purpose: flash dryer, precipitation, floculation, filtering or gravity settling. In this alternative embodiment, the material with approximately 20% solid ratio supplied from one of the above or other proceses 14 is mixed with the clay process material 20 in the mixer 24. The mixer 24 functions to evenly and continuously mix the material and break up lump in order to form a mixture that disperses the contaminated materials throughout the clay. The process needs a moisture content of the mixed sludge and clay that works for extrusion. This varies with the selected clay or shale but is preferably in the range of 15% to 40%. The water content in the mixer can be controlled by the addition of processed excess water from container 27.

After appropriate mixing, the material is either extruded 23 or pelletized 25. From the mixer, the sludge/clay mixture is transported into a pelletizer or extruder to form product nodules that would result in correct sizing for the final product to be utilized in the manufacture of products for the building and construction industries. The extruder 23 extrudes the mixed material into the desired size and shape. If used, the pelletizer may be one of several types of product pelletizers that creates the desired pellet size and shape for the final product.

After extrusion and/or pelletizing of the processed material it is transferred to the kiln 32. The kiln is preferably a direct fired refractory lined rotary kiln but may be an indirect fired rotary calciner or kiln. Materials flow into the kiln counter current to the gas flow in the kiln. The kiln has safety shut-off systems which include flame detectors and temperature controls. The mixture of the air to fuel for appropriate combustion is approximately 12:1 using natural gas as the fuel. Exhaust gas temperature would be controlled with water sprays using the processed excess water from container 27 as needed. In the kiln several processes occur as the pellets move through the slightly inclined, rotating kiln these processes are described below.

The first action of the kiln is the drier section 22 where the moisture in the pellets is removed by evaporation. Removal of the moisture at a relatively low temperature is important to avoid cracking or explosion of the pellets because of superheated steam forming in the pellets at high temperatures in the kiln. Preferably the product is dried at a temperature in the range of 300° Fahrenheit to 1000° Fahrenheit for approximately 10 minutes. The temperature range and time required for drying could vary depending on the moisture content of the pellets or the nature of the materials in the pellets.

Next the pellets are heated to the maximum kiln temperature between 1500° Fahrenheit and 2700° Fahrenheit for approximately 5 to 30 minutes at which time the metallic cations chemically combine with the silicates in the clay or shale to form chemically inert, safe compounds that are strongly bonded so that they cannot be easily extracted in accordance with any of the Federal or State tests developed for this purpose.

The clay/sludge ratio, kiln temperature and residence time may be optimized for each application as a function of metallic cation types present, their concentrations and the quality of available clays and shales. Typical parameters could be 8:1 for clay/sludge, kiln temperature of 2000° Fahrenheit maximum, total kiln residence time of 30 minutes including pellet drying time and 10 minutes in kiln at maximum temperature.

A fan evacuation system 34 is provided to remove the exhaust hot gas from the kiln which can be used in various other processes in the system. Either directly or after use in other processes in the system, the evacuated gas from the kiln goes to a scrubber or dust collector 28 which collects all dust and fugitive particles to ensure that no toxic waste or other undesirable by-products escape from the system. The scrubber or dust collector 28 then feeds the collected dust into the mixer 24 which mixes the collected dust with the processed material and the heavy sludge from the beginning processes.

After sintering in the kiln, the material is removed therefrom and placed in a heat exchanger 30 to cool the material so that it may be handled. The heat exchanger 30 is an air-cooled, or may be a water-cooled system.

The resulting product has many uses in the construction and building industries for use in the manufacture of concrete blocks, bricks and other building products for use in roads, curbs, flooring, decking and other building and construction applications.

Depending upon the type of clay used and the temperature of the kiln, the color of the processed material after sintering varies from white to chocolate brown. The different sintered color processed materials can be used in different types of finished products. For example, the darker products may be used in bricks and cinder whereas the lighter products may be more useful in concrete and other light colored building materials. The heated process materials are then removed from the premises and utilized in the manufacture of these various building and construction materials.

It is clear that the present invention provides a working, viable system for the processing of industrial waste into useful products capable of being used in the ordinary environment. The cost of this system is on the order of 10 times less than the cost of processing and hauling away the waste materials because of the cost of utilizing government-approved and safety-effectuated dump sites versus the cost of actually using the finished materials in end-product building and construction projects.

The materials as treated in the foregoing process are believed to be safe in accordance with the guidelines established by the Environmental Protection Agency of the United States Government. As set forth below in Table I, materials obtained from industrial sludge treated in accordance with the foregoing process are converted into useful safe material.

EXAMPLE

Clay from Southern California and clay from Northern California were utilized in the following example. Both clay materials effectively reduced the quantity of extractable nickel, zinc and cobalt to levels of 2% or less of the maximum Soluble Threshold Limit Concentrations (STLC) as specified by the Water Extraction Test (WET) values allowed in the EPA regulations and the State of California when clay/waste mixtures were calcined. For all three of the foregoing elements, nickel, zinc and cobalt, the results were better for the Northern California clay than for the Southern California clay.

The hazardous waste obtained for this experiment was electroless nickel spent plating bath from a Santa Clara County manufacturer with the following components:
Cobalt: 340 mg/L
Nickel: 1,500 mg/L
Zinc: 289 mg/L The clays were pre-ground to approximately −100 mesh. Each 200 grams of clay was mixed with 182 grams of hazardous waste liquid in a mixer. The slurries were dried overnight in an dryer oven at 220° Fahrenheit. The resultant dried cake was formed into a ⅜ pellets. Half of each sample was set aside for analysis and half was calcined in clay crucible (10 gms per crucible) in a muffle furnace for 33 minutes. The fired samples were blended and saved for analysis. The Total Threshold Limit Concentration (TTLC) for the unfired sample results are as follows:

| Element | TTLC Limit | No. Calif. Clay | So. Calif Clay |
|---|---|---|---|
| Cobalt | 8,000 mg/kg | 220 mg/kg | 260 mg/kg |
| Nickel | 2,000 mg/kg | 760 mg/kg | 780 mg/kg |
| Zinc | 5,000 mg/kg | 200 mg/kg | 240 mg/kg |

It should be noted that the tests show that the dried clay/sludge mixture did not fail the TTLC test limits.

The STLC test results using the WET procedure are as follows for both the Northern California and Southern California materials:

| ELEMENT | STLC LIMIT | STLC UNFIRED CLAY | | STLC FIRED CLAY | |
|---|---|---|---|---|---|
| | | No. Ca. | So. Ca. | No. Ca. | So. Ca. |
| Cobalt | 80 mg/L | 18 mg/L | 16 mg/L | 0.23 mg/L | 1.4 mg/L |
| Nickel | 20 mg/L | 71 mg/L | 65 mg/L | 0.48 mg/L | 2.5 mg/L |
| Zinc | 250 mg/L | 12 mg/L | 11 mg/L | 0.18 mg/L | 1.1 mg/L |

It will be obvious to a person of ordinary skill in the art that the foregoing represents a preferred embodiment of the present invention. The present invention is not so limited, but is intended to encompass the entire scope of the claims appended hereto and any equivalents thereof.

We claim:

1. A process for removing contaminants from hazardous liquid waste containing heavy metal cations comprising the steps of:
   providing natural clay or shale capable of adsorbing metal cations;
   reducing said clay or shale to finely divided particles with high specific surface area to enhance adsorption of metal cations;
   providing liquid waste having a solid content of less than 1% to 100% solids, said liquid waste containing said heavy metal cations;
   mixing said liquid waste and said clay or shale together in a predetermined concentration of between 1:1 to 40:1 parts clay or shale to liquid waste;
   extruding or pelletizing said mixed materials into nodules;
   drying said mixed material and sintering in a kiln or calciner at a temperature in the range of 1500° Fahrenheit to 2700° Fahrenheit for at least 5 minutes;
   cooling said sintered material; and
   incorporating said sintered material in construction materials selected from the group consisting of bricks, cinder blocks, and concrete aggregate.

2. The method according to claim 1 wherein said liquid waste is dried to a predetermined solid concentration of approximately 1% –40% solids.

3. The process of claim 2, wherein the mixed material is modified by increasing the moisture content thereof to obtain a predetermined moisture concentration by adding liquid to said material, said liquid comprising said liquid waste.

4. The process of claim 1, wherein said mixed material is fed directly into the calciner or kiln without being agglomerated.

5. The process of claim 1, wherein said sintered material is agglomerated into a sintered non-hazardous product useful for the building industry.

6. The process of claim 1, wherein moisture derived from said drying step is used in said cooling step to aid in the cooling of said sintered material.

7. The process of claim 1, further comprising a dust collector or scrubber coupled to said kiln or calciner to collect dust and fugitive material therefrom.

8. The process of claim 1, wherein said clays and shales are selcted from Monmorillonite or Kaolinite.

9. The process of claim 8, wherein a clay is provided, said clay being Montmorillonite.

10. The process of claim 8, wherein a clay is provided, said clay being Kaolinite.

11. The process of claim 8, wherein a shale is provided.

12. The process of claim 1 further comprising, during the mixing step, adding an additive into the mixer with the waste and clay to modify the product properties or reduce the cost of processing said additive being a fluxing agent capable of reducing the sintering temperature.

13. The process of claim 1 further comprising, during the mixing step, adding an additive into the mixer with the waste and clay to modify the product properties or reduce the cost or processing said additive being a coke to reduce the bulk density of said product.

14. A process for removing contaminants from hazardous liquid waste containing heavy metal cations comprising the steps of:
   providing clay selected from Montmorillonite and Kaolinite capable of adsorbing metal cations;
   reducing said clay to finely divided particles with high specific surface area to enhance adsorption of metal cations;
   providing liquid waste having a solid content of less than 1% to 100% solids, said liquid waste containing said heavy metal cations;
   mixing said liquid waste and said clay together in a predetermined concentration of between 1:1 to 40:1 parts clay to liquid waste;
   extruding or pelletizing said mixed materials into nodules;
   drying said mixed material and sintering in a kiln or calciner at a temperature in the range of 1500° Fahrenheit to 2700° Fahrenheit for at least 5 minutes;
   cooling said sintered material; and
   incorporating said sintered material in construction materials selected from the group consisting of bricks, cinder blocks and concrete aggregate.

* * * * *

UNITED STATES PATENT AND TRADEMARK OFFICE
CERTIFICATE OF CORRECTION

PATENT NO. : 4,882,067
DATED : 11/21/89
INVENTOR(S) : Johnson et al.

It is certified that error in the above-identified patent and that said Letters Patent is hereby corrected as shown below:

| | | |
|---|---|---|
| col. 02, line 21 | after "wastes" | insert --without-- |
| col. 04, line 20 | after "particles" | insert --.-- |
| col. 04, line 48 | delete "wastern" | insert --western-- |
| col. 05, line 23 | delete "lump" | insert --lumps-- |
| col. 06, line 17 | delete "evaculated" | insert --evacuated-- |
| col. 08, line 29 | delete "Monmorillonite" | insert --Montmorillonite-- |

Signed and Sealed this

Sixteenth Day of June, 1992

*Attest:*

DOUGLAS B. COMER

*Attesting Officer*     *Acting Commissioner of Patents and Trademarks*